United States Patent [19]

Korn et al.

[11] 4,262,551

[45] Apr. 21, 1981

[54] SAFETY STEERING WHEEL FOR MOTOR VEHICLES

[75] Inventors: Hans Korn, Hanau; Klaus Grothe, Aschaffenburg, both of Fed. Rep. of Germany

[73] Assignee: Karl Schmidt GmbH, Neckarsulm, Fed. Rep. of Germany

[21] Appl. No.: 922,412

[22] Filed: Jul. 6, 1978

[30] Foreign Application Priority Data

Jul. 7, 1977 [DE] Fed. Rep. of Germany ....... 2730672

[51] Int. Cl.³ .............................................. G05G 1/10
[52] U.S. Cl. ...................................................... 74/552
[58] Field of Search ............. 74/492, 552, 558, 558.5; 264/46.9, 45.3, 45.7; 428/313, 317, 425, 256, 254, 253

[56] References Cited

U.S. PATENT DOCUMENTS

| | | | |
|---|---|---|---|
| 2,388,933 | 11/1945 | Pearson | 66/170 X |
| 2,697,679 | 12/1954 | Zimarik | 428/317 |
| 2,866,357 | 12/1958 | Houghtaling | 74/558.5 X |
| 3,435,701 | 4/1969 | Bucher | 74/552 |
| 3,493,244 | 2/1970 | Bozich | 74/552 X |
| 3,596,532 | 8/1971 | Wilfert | 74/552 |
| 3,823,618 | 7/1974 | Broyer | 74/558.5 X |
| 3,881,971 | 5/1975 | Long | 428/425 |
| 3,901,091 | 8/1975 | Wenninger | 74/552 |
| 3,930,420 | 1/1976 | Kizu et al. | 74/558.5 X |
| 3,960,999 | 6/1976 | Massie | 428/313 |

OTHER PUBLICATIONS

"Potential Applications for Urethane Foam in Automobiles Total Over 24 lb. Per Car", Andrew Shearer, *Automobile Industries*, Mar. 1, 1958.

*Primary Examiner*—Samuel Scott
*Assistant Examiner*—Gerald Anderson
*Attorney, Agent, or Firm*—Sprung, Felfe, Horn, Lynch & Kramer

[57] ABSTRACT

An improvement in a bowl-shaped steering wheel for a motor vehicle which steering wheel comprises a rim and a hub, the improvement residing in a deformable body disposed between said rim and said hub, said deformable body being a knitted metal wire which is embedded in a homogeneous plastically deformable foamed plastic material.

6 Claims, 1 Drawing Figure

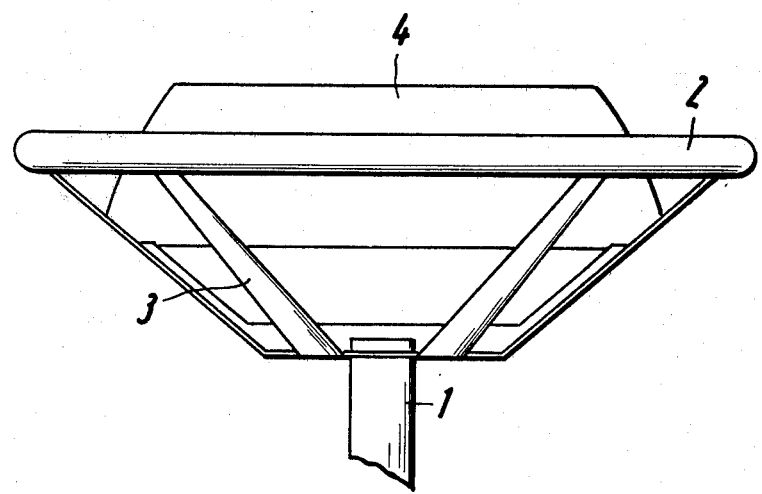

SAFETY STEERING WHEEL FOR MOTOR VEHICLES

This invention relates to a bowl-shaped steering wheel for motor vehicles, in which the steering wheel hub is recessed from the steering wheel rim and a deformable body is disposed between the steering wheel hub and the steering wheel rim.

Such steering wheel has been described in U.S. Pat. No. 2,948,869 and affords a certain safety against injury in case of an accident because the hub is recessed from the rim of the steering wheel, which intercepts the upper part of the body of the driver when the latter is thrown forwardly in case of an accident.

It is known, e.g., from German Utility Model No. 69 45 050, to use polyurthane foam for increasing the safety in the interior of motor vehicles. For instance, the steering wheel rim can be embedded in foam (Opened German Specification No. 19 20 064) and /or the steering wheel may be provided inwardly of its rim with a deformable body, which is cushioned with foamed plastic material and has a large surface and serves to distribute the force exerted by the impinging body of the driver over a surface which is as large as possible (Printed German Application No. 18 15 130).

In the development of such deformable bodies it is endeavored to ensure that the force-deformation line is a close approximation to the horizontal axis on which the deformation is plotted, i.e., that the retardation of the body of the driver after an impact is substantially constant. From the weight aspect, such deformable bodies should not be too heavy, although they should have an adequate stability. The requirement of effecting a substantially constant retardation during a deformation is not met by the previously used polyurethane foams because they are soft and elastic so that they exhibit a very irregular ratio of absorbed force to deformation. Besides, polyurethane foams have a relatively low inherent stability so that they will be destroyed in an area in which they are subjected to a point load, e.g., a shock load, imposed by an object having a small area.

Another disadvantage of these deformable bodies resides in that they can take up deformation energy only under a relatively high load, as a rule, and for this reason are ineffective or less than fully effective in case of an impact of the head of the driver.

It is an object of this invention, therefore, to provide in a safety steering wheel for a motor vehicle wherein the steering wheel hub is recessed from the steering wheel rim and a deformable body is disposed there between, a deformable body where the retardation effected by it is approximately constant so that force upon the same is absorbed at a constant rate.

It is also an object of this invention to provide such a steering wheel in which the deformable body is fully effective in case of an impact of the head of the driver and is not destroyed in an area in which it is subjected to a point load.

This object is accomplished in that the deformable body which is disposed between the hub and rim of a steering wheel described first hereinbefore consists, in accordance with the invention of knitted metal wire, which is embedded in homogeneous, plastically deformable, foamed plastic material, preferably polyurethane. As is known per se, the foamed plastic material has a microporous, closed surface (German Utility Model No. 71 25 806).

Such a combination of foamed plastic material and knitted wire effects an almost constant retardation. During a deformation of a deformable body consisting of this material, the body will exhibit a very constant ratio of compression to deformation and an almost constant retardation. The compression of the deformable body begins as soon as a force is exerted thereon and said compression proceeds uniformly until the kinetic energy which has been applied is consumed. Under the action of a relatively small force, only a part of the deformable body is compressed whereas the profile of the remaining part of the body remains substantially unchanged.

Further advantages afforded by the invention reside in the method of series production, the low manufacturing costs and the light weight. The energy-absorbing properties of the steering wheel can be predetermined by the selection of the dimensions of the deformable body, of the thickness of the wires employed, and of the density of the plastic material foam, and can thus be matched to vehicles of different weight and power classes.

BRIEF DESCRIPTION OF DRAWING

An embodiment of the invention is shown diagrammatically in the accompanying drawing and is explained more fully below.

DESCRIPTION OF SPECIFIC EMBODIMENT

The drawing shows in side elevation a bowl-shaped safety steering wheel, in which the hub 1 is recessed from the rim 2. The spokes 3 of the steering wheel carry a deformable body 4, which consists of a knitted metal wire, which is embedded in polyurethane foam.

SUMMARY

In a bowl-shaped steering wheel for motor vehicles, a deformable body (4) is arranged between the rim (2) of the steering wheel and the hub (1) thereof, which is recessed from the rim.

To provide for an approximately constant deceleration in case of a deformation of the deformable body (4), the latter consists of knitted metal wire, which is embedded in homogeneous, plastically deformable, foamed plastic material.

APPENDIX

The knitted metal wire can be made of any metallic composition. It can be pure metal such as iron or can be an alloy such as steel. The metal wire can be of any metallic composition including iron (an its alloys), copper (and its alloys), aluminium, tin, lead, and the like, including their alloys. Generally speaking, the wire of the knit has a thickness between 0.1 and 2.0 mm preferably between 0.3 and 1.5 mm. The density of the knit is between $0.05$–$0.50$ g/m$^3$ preferably $0.10$–$0.30$ g/cm$^3$.

The homogeneous plastically deformable foamed plastic material can be thermoplastic or thermosetting. Included within this term are compositions such as urea formaldehyde, foams, phenol formaldehyde foams, polystyrene foams, PVC foams, ABS-copolymer foams, polyethylene foams, and polypropylene foams.

Generally speaking, the homogeneous plastically deformable foamed plastic material has a density between 0.01 and 2.0 g/cm$^3$ preferably between 0.05 and 2.0 g/cm$^3$ determined at room temperature at atmospheric pressure. Preferably, the plastic foam material has closed pores, although in some instances open pored foamed plastic material can also be used.

Generally speaking, the thickness of the plastic material of the overall knit ranges from between 0.5 and 3 mm.

What is claimed is:

1. In a bowl-shaped steering wheel for a motor vehicle comprising a steering wheel hub and a steering wheel rim, said steering wheel hub being recessed from said steering wheel rim, said steering wheel having a deformable body disposed between said steering wheel hub and said steering wheel rim the improvement wherein said deformable body comprises a knitted metal wire which is imbedded in a homogeneous plastically deformable foamed plastic material.

2. A bowl-shaped steering wheel according to claim 1 wherein said foamed plastic material is polyurethane.

3. A steering wheel according to claim 1 wherein said foamed plastic material has a microporous closed surface.

4. A steering wheel according to claim 1 wherein said knitted metal wire has a thickness between 0.1 and 2.0 mm and the density of the knit is between 0.05 and 0.50 g/cm$^3$.

5. A steering wheel according to claim 4 wherein the wire of the knit has a thickness between 0.3 and 1.5 mm and the density of the knit is between 0.10 and 0.30 g/cm$^3$.

6. A bowl-shaped steering wheel according to claim 4 wherein said deformable body during deformation exhibits a constant ratio of compression to deformation and an almost constant retardation.

* * * * *